H. HESS.
SOLDERING PACK.
APPLICATION FILED JAN. 23, 1913.

1,291,878.

Patented Jan. 21, 1919.

UNITED STATES PATENT OFFICE.

HENRY HESS, OF PHILADELPHIA, PENNSYLVANIA.

SOLDERING-PACK.

1,291,878.     Specification of Letters Patent.     Patented Jan. 21, 1919.

Application filed January 23, 1913. Serial No. 743,718.

*To all whom it may concern:*

Be it known that I, HENRY HESS, a citizen of the United States, residing at Philadelphia, in the county of Philadelphia and State of Pennsylvania, have invented certain new and useful Improvements in Soldering-Packs, of which the following is a specification, reference being had therein to the accompanying drawing.

The object of this invention is to produce a soldering material and flux in such combined form that it may be conveniently applied to the parts to be united, and the soldering operation performed by unskilled persons with the employment of a moderate degree of heat and without waste of material.

With these and other objects in view, my invention consists primarily of a soldering body or mass of metal filaments or threads and a flux disposed among the filaments.

More specifically, and in the preferred embodiment of the invention, the mass of filaments is compacted or condensed into a self-holding body containing a suitable flux in liquid or pasty form distributed among the filaments so as to cover the same and be entrapped thereby. But it will be manifest that the invention is susceptible of different forms and embodiments without departing from the spirit of the same; and it will be understood that the invention is not limited to any particular form of the parts, materials, or construction, except in so far as such limitations are specified in the claims.

Figure 1:
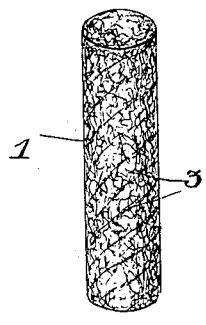
Figure 1 is a perspective sectional view of my improved soldering pack in one form.

Referring to Fig. 1, 1 represents a self-holding body consisting of a mass of metal threads, filaments, or like elongated objects, which are matted or compacted together and twisted in the form of a rope. Distributed among the filaments of this body is a flux 3, which is preferably of liquid or pasty form, and so combined as to cover and coat the filaments generally throughout the mass, and be thus entrapped among the filaments.

Figure 2:
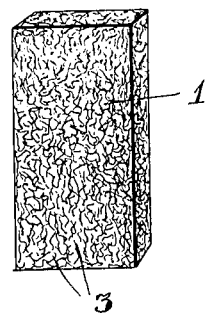
Fig. 2 is a similar view illustrating another form of the same.

In Fig. 2 the same construction is represented, except that the mass of filaments or threads is shown as felted into a compacted or condensed form, and the self-holding body is shown as of flat form, rectangular in cross-section instead of round in cross-section, as in the first instance described. So also other forms, shapes and constructions of the self-holding bodies may be produced.

Figure 3:
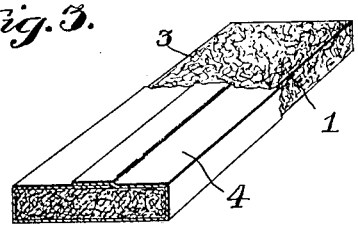
Fig. 3 is a similar view, showing the soldering pack inclosed in a protective covering.

As shown in Fig. 3, I may cover the bodies of filaments with a protective coating 4 which will preferably be of a material, such as metal foil, which will itself act as a solder. By this form, sticks of the combined soldering material and flux may be made by covering a body such as shown in Fig. 1, with a casing of metal foil; or flat sections of the combined solder or flux may be made by flattening out the rope-like body of Fig. 1 and covering the same with a suitable foil; or a felted, flat body of the form of Fig. 2 may be covered with the protective foil.

The filaments of the body may be formed of different kinds of metal, and different kinds of fluxes may be employed, the selection of these constituents depending upon the character of the work to be done. For soft work, analogous to what is generally known as "soft soldering", the lead and tin alloys may be employed, and for these metals the flux will preferably consist of a deoxidizer or protector, such as glycerin or vaseline, or various fats or like substances, in combination with a cleanser, such as sal ammoniac or any of the various materials generally employed for this purpose, the preference being for such materials as will leave no free acid and no residue after burning. For so-called "hard soldering", the filaments will be composed of what is known as good spelter, copper, or brass, etc. The flux for such materials should have a higher melting or fusing point and may be composed of powdered borax, or water-glass, or powdered glass and the like. These fluxes may be maintained in pasty or liquid form until used by being mixed with glycerin, vaseline, and the like, as described in connection with the fluxes for the soft soldering.

In the formation of the soldering pack the flux may be applied to and incorporated among the filaments in any appropriate manner, the filaments being preferably coated with the flux before they are condensed or compacted into form.

By reason of the construction of the soldering pack described, and the susceptibility of the same to be produced in various shapes and forms, the material may be conveniently handled and applied to the parts to be united by unskilled persons. Furthermore, on account of the filament or thread-like form of the metal composing the body and the intimate incorporation of the flux, the metal will melt, flow and fuse readily in the soldering operation, even on the application of a moderate degree of heat.

It is characteristic of the several forms of my invention illustrated, that the self-holding body consists of a conglomerated mass of filaments compacted into definite form, the flux being distributed throughout the mass.

Having thus described my invention, what I claim is:

1. A soldering pack consisting of a conglomerated mass of filaments of a soldering metal adapted to constitute the solder in a soldering operation, said filaments being compacted into a self-holding body, and a flux disposed among and inclosed by said filaments.

2. A soldering pack consisting of a conglomerated mass of filaments of a soldering metal adapted to constitute the solder in a soldering operation, said filaments being coated with a flux and compacted into a self-holding body, whereby the flux will be entrapped by and inclosed in the body of filaments.

3. A soft-soldering pack consisting of a conglomerated mass of soft solder metal filaments adapted to constitute the solder in a soldering operation, said filaments being compacted into a self-holding body, and a flux disposed among and inclosed by said filaments.

In testimony whereof I affix my signature in presence of two witnesses.

HENRY HESS.

Witnesses:
  THEO. H. M'CALLA,
  B. KENNEDY.